June 29, 1943. F. H. HIBBARD 2,322,848
PULSE REGENERATOR
Filed June 10, 1942  3 Sheets-Sheet 1

INVENTOR
F. H. HIBBARD
BY
John A. Hall
ATTORNEY

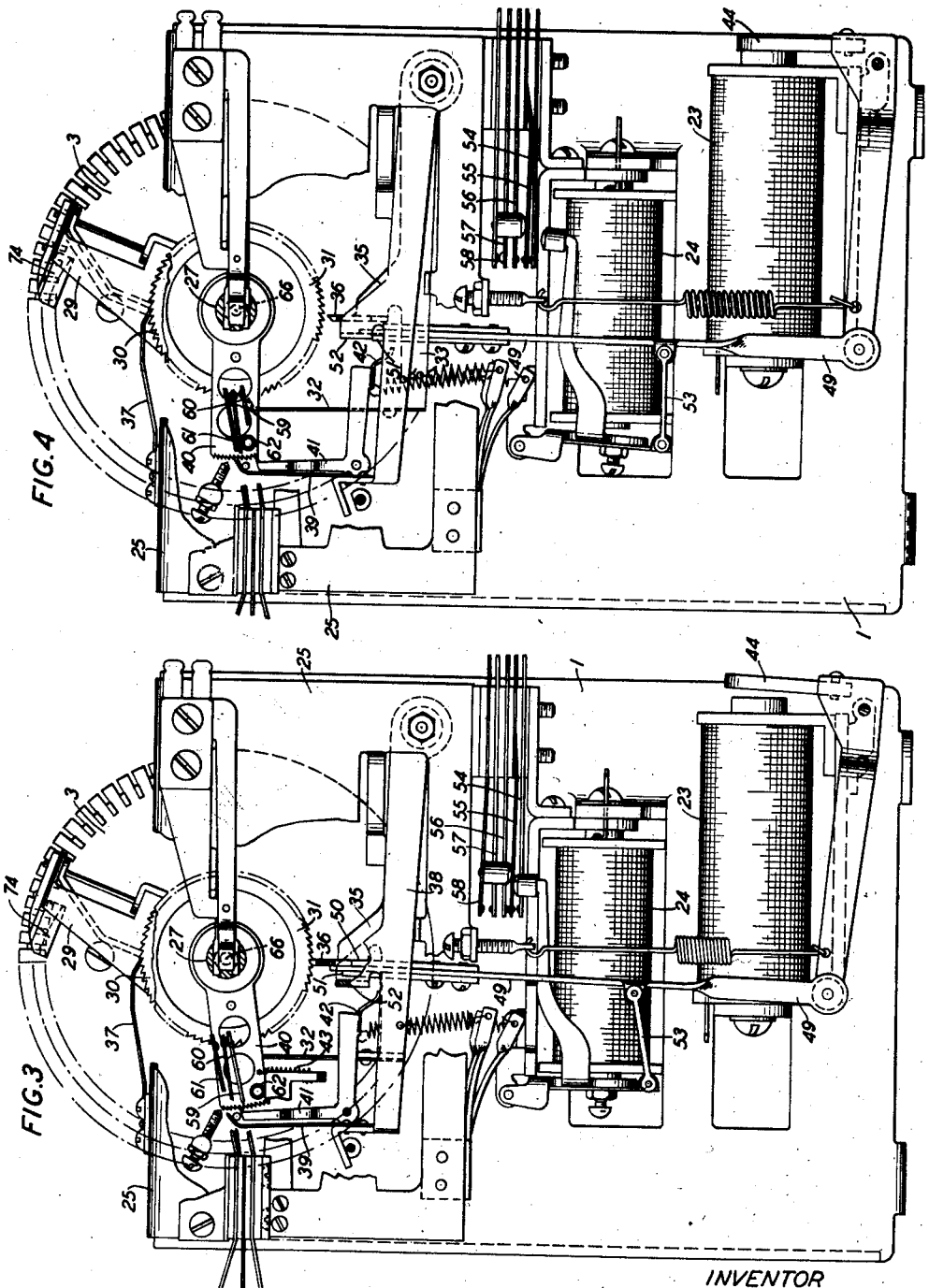

June 29, 1943.  F. H. HIBBARD  2,322,848
PULSE REGENERATOR
Filed June 10, 1942  3 Sheets-Sheet 3

INVENTOR
F. H. HIBBARD
BY
John A. Hall
ATTORNEY

Patented June 29, 1943

2,322,848

UNITED STATES PATENT OFFICE 2,322,848

PULSE REGENERATOR

Frank H. Hibbard, Mountain Lakes, N. J., assignor to Bell Telephone Laboratories, Incorporated, New York, N. Y., a corporation of New York Application June 10, 1942, Serial No. 446,481

5 Claims. (Cl. 177—380)

This invention relates to pulse regenerators of the register sender type comprising essentially a mechanical device which is used in an electrical circuit for relaying electrical effects.

The object of the invention is to provide a simple and economical mechanical device which will respond to incoming electrical effects and thereafter control the transmission of outgoing electrical effects. In one form the incoming and outgoing effects will be identical except in what may be termed purity. Such a device is particularly useful in long signaling circuits where due to the length and condition of the transmission circuit the incoming signals may be distorted both in time and strength. Such a device will then respond to such signals and thereupon transmit regenerated or correct signals. The device in a preferred embodiment herein disclosed is useful in a telephone system for the regeneration of switch setting pulses which are usually transmitted on a decimal basis, spoken of as trains of digital pulses. In this form the device responds to a train of pulses by registering the length of the train by displacing a mechanically displaceable member, the last one of a series corresponding in number to the number of pulses in the train. Thereafter an outgoing portion steps forward, transmitting an impulse for each step, the number of impulses being limited by encounter with the said displaced element.

The object of the invention is further to provide a simple and economical device which will transmit accurately timed outgoing pulses and which will accurately measure a minimum interval between trains of such outgoing pulses.

In accordance with this object a stepping magnet for the outgoing portion of the device is arranged to operate on an accurately timed basis whereby its time of operation and time of release will remain substantially constant over a wide range of variation of energization. The slow release of a relay may be maintained practically constant if the energization is at a constant level. To achieve this constant energization, means are provided to open the circuit of such a relay when a predetermined level of energization has been reached though the energization might reach a higher level otherwise, under varying external conditions.

A feature of the invention is the use of such a precisely arranged stepping magnet for operating a timing mechanism in addition to its ordinary function of stepping a selecting arm. Accordingly, when an outgoing train of pulses is to be transmitted the stepping magnet operates a pointer or selecting arm until a displaced element is encountered whereupon the stepping magnet ceases to control such pointer or selecting arm but continues its operation for a predetermined number of steps whereby a definite time interval is measured off.

Another feature of the invention is the control of two separate stepping ratchets by a single stepping magnet with a means to shift from control of one to control of another under certain given conditions. Thus when outgoing pulses are to be transmitted the stepping magnet operates to control one ratchet until such ratchet is satisfied whereupon control is shifted to the other ratchet and the stepping magnet continues to operate for a given time to measure an interdigit pause.

Another feature of the invention is the use of a precisely adjusted stepping magnet and an impulser and the further use of such stepping magnet after its impulse sending functions have been discharged as a time counting means.

The drawings consist of three sheets having five figures, as follows:

Fig. 3 is an end face view showing the apparatus of the output side of the regenerator. This figure shows the cooperative relationship of the parts during the sending of the output pulses;

Fig. 4 is a similar view showing the cooperative relationship of the parts during the interdigit pause.

Figure 5:
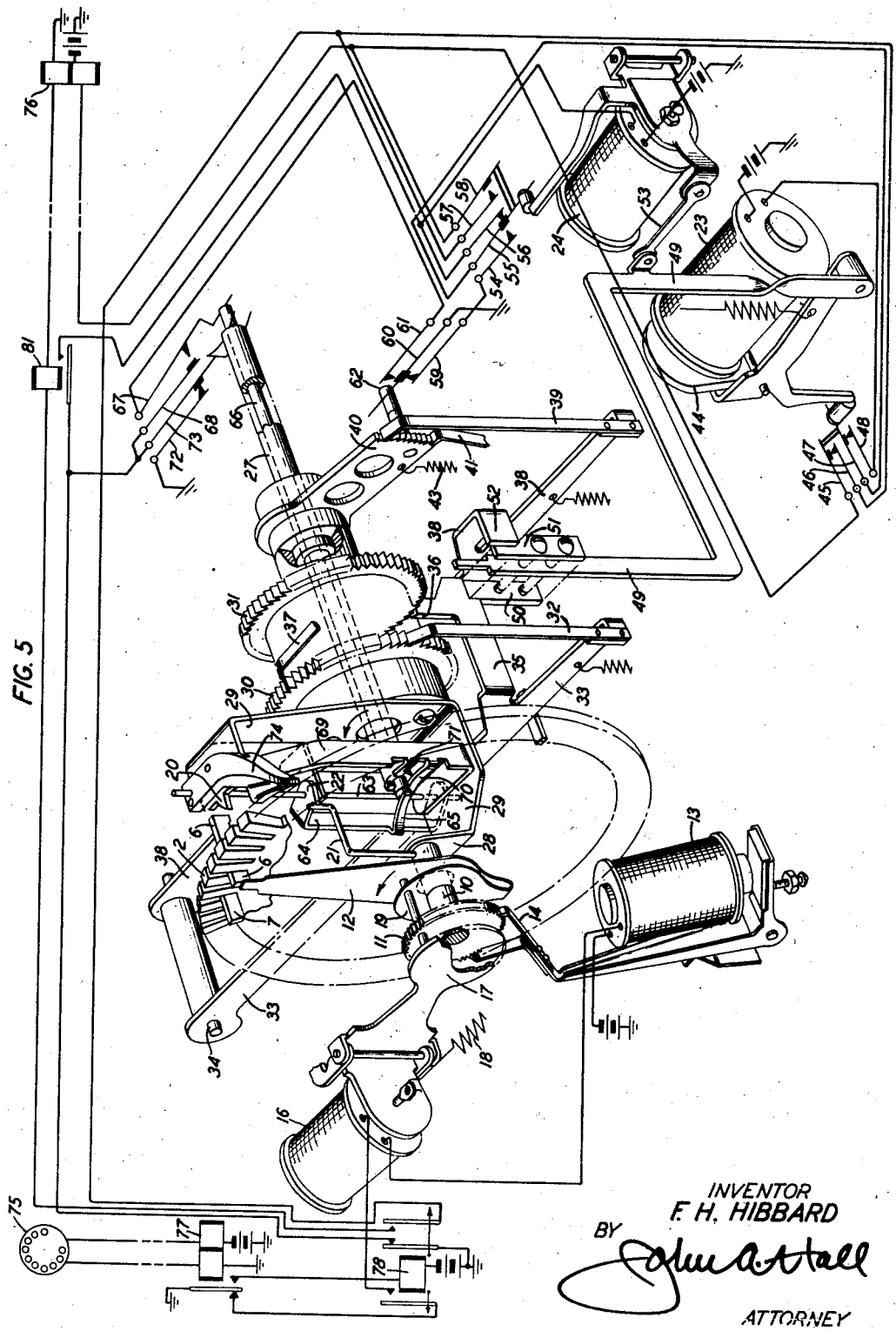
Fig. 5 is an exploded perspective schematic view designed to make the method of operation clear. This figure also contains a circuit diagram showing the electrical connections to the various parts.

The device consists of a frame plate 1 serving as a base on which the various parts are mounted and which may be secured to any general frame or base to which a plurality of such devices may be secured. A pair of circular discs 2 and 3 are suitably secured in spaced relation to each other and mounted on the frame plate 1 by means of lugs 4 and 5 in such a manner that the selector arms may be moved freely over the faces thereof. Each of the discs 2 and 3 are slotted or toothed radially at their outer edges and the two discs are secured together so that the corresponding slots register with each other. In each slot there is placed a displaceable member such as 6 and 7 shown in Fig. 5 and these are all held in place by two endless loops of spiral springs 8 and 9. The displaceable members are normally in a position where considerable of their length extends from the plate 2 in the direction of the incoming side of the device. The spiral springs 8 and 9 hold the displaceable members in either this, their normal positions, or in their alternate positions when they have been pushed in the direction of the outgoing side of the device. In Fig. 5 the member 7 is shown in its normal position while the member 6 is shown being pushed into its alternate position.

Figures 1, 2:
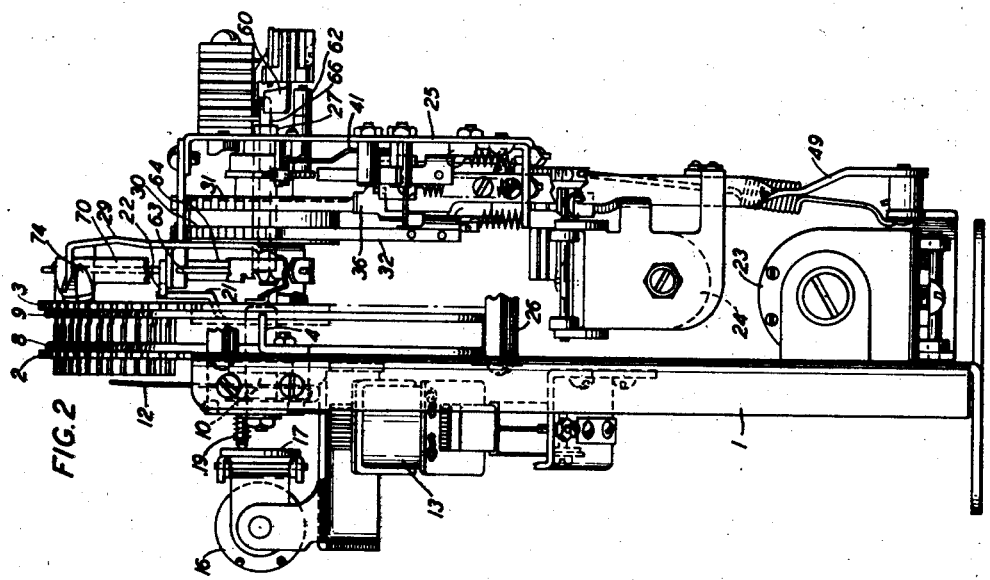
Fig. 1 is an end face view showing the apparatus of the input side of the regenerator.
Fig. 2 is a side view looking at the apparatus of Fig. 1 from the right.

Journaled in the discs 2 and 3 at the center points thereof is a shaft 10 to which is firmly secured a ratchet wheel 11 and a selector arm 12. A stepping magnet 13 operates a pawl 14 by which the shaft and the selector arm 12 are moved step by step in a counterclockwise direction as indicated in Figs. 1 and 5. At the end of each step the tip of the selector arm is in cooperative relationship with one of the displaceable elements. The retaining pawl 15 holds the shaft 10 against retrograde movement as the stepping magnet operates and the pawl 14 drops into another tooth of the ratchet wheel 11. One great advantage of this construction is that the incoming selector arm may be of light construction so that there is no great load to be moved and the mechanical inertia may be small. Consequently, fast and accurate operation may be achieved.

During the operation of the stepping magnet 13 a slow release magnet 16 is operated. Shortly after the last operation of the stepping magnet 13 the magnet 16 will release. Thereupon a disc 17 controlled by the armature of magnet 16 will move under the influence of spring 18 toward the disc 2 and impelling a pin 19 in the same direction will move the tip of the selector arm 12 to push the displaceable element 6 outwardly beyond the surface of the disc 3 so that it will come into the path of a detector cam 20 for a purpose to be hereinafter described. The shaft 10 also carries a pin 21 beyond the face of the disc 3 to place an obstacle in the path of off-normal cam 22.

At the outgoing side of the device there is a stepping magnet 23 and a transfer magnet 24. An auxliary mounting frame 25 is secured in spaced relationship to the frame plate 1 by a number of spring studs 26. The rotating elements of the outgoing side are secured in place by an appropriate journal in the plate 25 accommodating the shaft 27 and by a journal formed in the ear 28 of the element 29. The end of the shaft 10 is placed in this journal. The element 29 is secured to a pair of ratchet wheels 30 and 31 which are loosely mounted on the shaft 27. A pawl 32 is secured to an arm 33 which is pivoted on a bearing pin 34 mounted in the plates 1 and 25. A portion of the arm 33 is bent to form the element 35 and carries a catch 36 which cooperates with the ratchet wheel 31. When the arm 33 is moved upwardly the pawl 32 in engagement with the ratchet wheel 30 moves this ratchet wheel one step in a counterclockwise direction and the catch 36 engages a tooth of the ratchet wheel 31 to limit the movement of the assembly to a single step. When the arm 33 is released and moves downwardly the retaining pawl 37 prevents retrograde movement of the assembly.

Another arm 38, pivoted on the pin 34, carries at its extremity a pawl 39 which engages a small sector 40 of a ratchet wheel loosely pivoted on the shaft 27. A retaining pawl 41 for holding the sector 40 in any given operated position is mounted on the plate 25 and is controlled by the arm 33. In Fig. 4 the retaining pawl 41 is shown in engagement with the teeth of the sector 40 and the portion 42 thereof which engages the arm 33 is some distance therefrom. In Fig. 3, where the arm 33 has moved upwardly and engaged the portion 42 of the retaining pawl 41, this retaining pawl is shown out of engagement with the sector 40. Under this condition the sector 40 is returned to its normal position by the spring 43.

The stepping magnet 23 is provided with an armature 44 which operates the contact springs 45, 46, 47 and 48. Pivoted on the end of this armature is an element 49 provided with a catch 50 for engaging the portion 35 of the arm 33 and a catch 51 for engaging the portion 52 of the arm 38. When the transfer magnet 24 is energized the link 53 moves the element 49 to the position where the catch 50 cooperates with the portion 35 so that at this time the arm 33 and its pawl 32 partake of the movement of the armature 44. When the transfer magnet is released then through the link 53 the element 49 is moved to the position where the catch 51 cooperates with the portion 52 so that at this time the arm 38 and its pawl 39 partakes of the movement of the armature 44.

The transfer magnet 24 controls contact springs 54, 55, 56, 57 and 58 which are shown in their operated positions in Figs. 5 and 3 and in their normal positions in Fig. 4. The sector 40 carries a pin of insulation 62 which upon the sixth step of the sector engages a contact spring 60 and moves it from connection with spring 59 into connection with spring 61.

The plate 29 affixed to the ratchet wheel 30 has a pin 63 mounted in properly disposed journals and forms a pivot for the off-normal cam 22 and the detector cam 20. The off-normal cam 22 is a portion of the element 64 carrying a finger 65 which bears against the shaft 66 to open the connection between contact springs 67 and 68. When the regenerator is normal the outgoing assembly has rotated to a point where the off-normal cam 22 has engaged the pin 21 thus causing the rotation of the element 64 and the movement of the finger 65 against the shaft 66. Thus, in normal position, the springs 67 and 68 are separated.

The detector cam 20 is a part of element 69 which carries a pair of fingers 70 and 71 which press on the hollow shaft 27 to separate the contact springs 72 and 73. In the rotational step-by-step movement of the outgoing pulse assembly when the cam 20 overtakes a displaceable element such as the one designated 6 in Fig. 5, the element 69 is rotated, the hollow shaft 27 is moved toward the right and the contact between springs 72 and 73 is broken.

A restoring shoe 74 is affixed to the upper end of the element 29 and serves in the rotational movement of the outgoing assembly to move all displaced elements to their normal positions. It should be noted that this shoe is so fashioned that the restoration of a displaceable element is accomplished in several steps so that the drag on the outgoing assembly is not unduly great at any time.

The manner of operation of the device in its circuit arrangement is as follows: The dial 75 represents a station which is to eventually control some apparatus under control of a distant relay 76. The station represented by the dial 75 is connected over a line to a relay 77. When the line is taken for use relay 77 responds and causes the operation of the first slow relay 78 which prepares a stepping circuit for the incoming side of the device. When the dial 75 is operated each impulse sent therefrom is in the form of a short interruption of the energizing circuit of relay 77 and this relay, therefore, releases once for each such impulse. Upon the first such impulse a circuit is established from ground, the back contact of relay 77, left-hand armature and front contact of relay 78 and thence in series through the windings of magnets 16 and 13 to battery. Magnet 13 responds to each impulse separately while magnet 16 responds to the train of impulses as a whole. Magnet 16 lifts the disc 17, allows the pin 19 to move toward the left and frees the selector arm 12. Magnet 13 causes the pawl 14 to move into another tooth of the ratchet wheel 11 so that at the end of the impulse the selector arm 12 will be advanced into cooperative relationship with the next displaceable element. At the end of the train of impulses magnet 16 will release and cause the last displaceable element reached by the selector arm 12 to be moved toward the right and into the track of the detector cam 20.

On the outgoing side the action is as follows: Upon the first step of the selector arm 12 the off-normal cam 22 will be released, whereupon contacts 67 and 68 will be closed together. A circuit will then be established from ground in series through contacts 72, 73, 68 and 67 and thence through the winding of transfer magnet 24 to battery, whereupon this magnet operates and transfers control of the part 49 from arm 38 to arm 33. The ground for the operation of magnet 24 is now extended from contact 56 to contact 55, thence through contacts 47 and 48 to the winding of magnet 23, whereupon magnet 23 is energized through this self-interrupting circuit. Upon the first movement of the part 49 and the arm 33 the retaining pawl 41 is moved and the sector 40 is released. Upon each movement of the part 49 the outgoing assembly is moved one step and this movement will continue until the detector cam 20 overtakes an operated displaceable element.

Upon the energization of relay 78 an energizing circuit for the distant relay 76 is closed through relay 81, front contact and armature of relay 78, springs 46 and 45 and in parallel therewith springs 57 and 58 and thence back to relay 76. Thus the distant apparatus is seized as soon as the incoming selector arm 12 is moved. As soon as magnet 24 is operated the contact between springs 57 and 58 is opened so that the stepping magnet 23 now has control over the distant line relay 76. Each movement of the armature 44 produces an interruption of the circuit of relay 76 and thus constitutes an outgoing pulse.

It should be noted that the outgoing stepping magnet 23 is arranged to step its armature accurately. By way of example, it may be arranged to have an operate time of .034 second and a release time of .066 second when it is desired to pulse at the standard rate of ten pulses per second. Thus the outgoing pulses may be accurately timed.

When the detector cam 20 encounters an operated displaceable element the spring 73 is moved from contact with the spring 72 and the transfer magnet 24 is released. The part 49 is now moved from association with arm 33 into association with arm 38. The outgoing line circuit is closed by contacts 57 and 58 so that further operation of magnet 23 will not produce more pulses. Magnet 23 is now included in a self-interrupting circuit from ground spring 60, spring 59, spring 54 and spring 55 so that magnet 23 continues to operate. Its operation at this time, however, moves the pawl 39 so that the sector 40 is stepped forward. By way of example, this sector may be given six steps to measure off an interdigit pause of six tenths of a second. At the end of the sixth step, spring 60 will be transferred from spring 59 to spring 61 so that ground will be extended to spring 68 by way of the contact and armature of trunk control relay 81. If at this time springs 67 and 68 are closed, indicating that the incoming selector arm 12 has moved forward, the cycle just described will be repeated.

If the subscriber at station 75 has paused an undue length of time or if no more trains of pulses are to be sent, then the off-normal cam 22 will encounter the pin 21 and springs 67 and 68 will be separated thus stopping the action of the outgoing side of the regenerator. When the call is abandoned and relay 77 is released, relay 76 will be released by the slow relay 78.

If the call is abandoned while the outgoing side has still one or more trains of impulses to send, the ground at the inner right-hand armature and back contact of relay 78 will operate the outgoing side until the off-normal contact 22 overtakes the pin 21 but no more pulses will be sent because the outgoing line circuit will be opened by the outer right-hand armature of relay 78.

What is claimed is:

1. A device comprising a field of mechanically displaceable elements, a step-by-step means responsive to an incoming train of impulses for passing a pointer over said field a number of elements corresponding to the number of impulses in said train and for displacing the last one of said elements reached by said pointer, an outgoing stepping magnet having precisely timed operating characteristics for passing a pointer over said field traversed by said first pointer, means controlled by said stepping magnet for transmitting an impulse on each stepping operation thereof, means for terminating said transmission of impulses responsive to the encounter of said second pointer with a displaced element, and means controlled by further operation of said stepping magnet for measuring time for an interdigit pause.

2. A device comprising a field of mechanically displaceable elements, a step-by-step means responsive to an incoming train of impulses for passing a pointer over said field a number of elements corresponding to the number of impulses in said train and for displacing the last one of said elements reached by said pointer, an outgoing stepping magnet having precisely timed operating characteristics, a first ratchet, a second ratchet, means for shifting the cooperative relationship of said stepping magnet from said first ratchet to said second ratchet, means controlled by said stepping magnet for transmitting an impulse on each stepping operation thereof, means comprising a second pointer moved by said first ratchet for terminating said transmission of impulses responsive to the encounter of said second pointer with a displaced element, and means for thereafter causing said stepping magnet to automatically operate a predetermined number of times in cooperative relationship with said second ratchet to measure an interdigit pause.

3. A device comprising a field of mechanically displaceable elements, a step-by-step means responsive to an incoming train of impulses for passing a pointer over said field a number of elements corresponding to the number of impulses in said train and for displacing the last one of said elements reached by said pointer, an outgoing stepping magnet having precisely timed operating characteristics, a first ratchet, a second ratchet, means for alternatively bringing said stepping magnet into cooperative relationship with said ratchets, means under the joint control of said stepping magnet and said last means when said stepping magnet is in cooperative relationship with said first ratchet for transmitting an impulse on each stepping operation of said magnet, a second pointer movable under control of said first ratchet, means for terminating said transmission of impulses responsive to the encounter of said second pointer with a displaced element, and means for thereafter causing said stepping magnet to automatically operate a predetermined number of times in cooperative relationship with said second ratchet to measure an interdigit pause.

4. A device comprising a field of mechanically displaceable elements, a step-by-step means responsive to an incoming train of impulses for passing a pointer over said field a number of elements corresponding to the number of impulses in said train and for displacing the last one of said elements reached by said pointer, an outgoing stepping magnet having precisely timed operating characteristics, a first ratchet, a second ratchet, a dual purpose pawl controlled by said stepping magnet for alternative cooperative relationship with said two ratchets, a shift magnet for taking said pawl out of normal cooperative relationship with said first ratchet and for placing said pawl into cooperative relationship with said second ratchet, a circuit arrangement including contact springs operable by said magnets for transmitting an impulse on each stepping operation of said stepping magnet while said pawl is in cooperative relationship with said first ratchet, a second pointer operated by said first ratchet, means for terminating said transmission of impulses responsive to the encounter of said second pointer with a displaced element, said last means causing the operation of said shift magnet, and means for thereafter causing said stepping magnet to automatically operate a predetermined number of times to measure an interdigit pause.

5. A device comprising a field of mechanically displaceable elements, a step-by-step means responsive to an incoming train of impulses for passing a pointer over said field a number of elements corresponding to the number of impulses in said train and for displacing the last one of said elements reached by said pointer, an outgoing stepping magnet having precisely timed operating characteristics, a first ratchet, a second ratchet, a dual purpose pawl controlled by said stepping magnet for alternative cooperative relationship with said two ratchets, a shift magnet for taking said pawl out of normal cooperative relationship with said first ratchet and for placing said pawl into cooperative relationship with said second ratchet, a circuit arrangement including contact springs operable by said magnets for transmitting an impulse on each stepping operation of said stepping magnet while said pawl is in cooperative relationship with said first ratchet, a second pointer operated by said first ratchet, means for terminating said transmission of impulses responsive to the encounter of said second pointer with a displaced element, said last means causing the operation of said shift magnet, and means controlled by said second ratchet after a predetermined number of stepping operations of said stepping magnet to restore the normal relationship between said stepping magnet and said first ratchet to prepare for the transmission of another series of outgoing impulses.

FRANK H. HIBBARD.